United States Patent [19]
Nishizawa

[11] Patent Number: 5,271,639
[45] Date of Patent: Dec. 21, 1993

[54] MECHANICAL SENSOR FOR VEHICLE SEAT BELT SYSTEMS

[75] Inventor: Muneo Nishizawa, Shiga, Japan

[73] Assignee: Takata Corporation, Tokyo, Japan

[21] Appl. No.: 906,063

[22] Filed: Jun. 29, 1992

[30] Foreign Application Priority Data

Jun. 28, 1991 [JP] Japan .................. 3-184086

[51] Int. Cl.$^5$ ............................ B60R 22/40
[52] U.S. Cl. .................... 280/806; 297/480; 116/203; 116/283
[58] Field of Search ........... 280/806; 297/480; 116/203, 281, 283; 200/61.45 R, 61.53; 180/282

[56] References Cited

U.S. PATENT DOCUMENTS

| | | | |
|---|---|---|---|
| 4,889,068 | 12/1989 | Tabata et al. | 280/806 |
| 4,913,497 | 4/1990 | Knabel et al. | 297/480 |
| 4,999,004 | 3/1991 | Skanberg et al. | 280/806 |

FOREIGN PATENT DOCUMENTS

| | | | |
|---|---|---|---|
| 3932090 | 11/1990 | Fed. Rep. of Germany | 280/806 |
| 57-90159 | 6/1982 | Japan . | |
| 58-206765 | 12/1983 | Japan . | |
| 63-35017 | 9/1988 | Japan . | |
| 1-164650 | 6/1989 | Japan . | |

Primary Examiner—Margaret A. Focarino
Assistant Examiner—Paul Dickson
Attorney, Agent, or Firm—Brumbaugh, Graves, Donohue & Raymond

[57] ABSTRACT

A mechanical sensor comprises a casing having an axis, an inertia body received in the casing for displacement axially thereof, and an output member received in the casing for displacement axially thereof and having a portion extending out of the casing so as to transmit displacement of the output member to the outside of the casing. A set spring biases the inertia body to a set position in the casing. A stopper is received for axial displacement within the casing, and an actuator spring is engaged between the inertia body and the stopper and is also engageable with the output member to cause it to displace upon displacement of the stopper. Latch members movably coupled to the inertia body are engaged between the stopper and the casing in the absence of displacement of the inertia body in response to a predetermined acceleration of the inertia body so that the stopper stores energy in the actuator spring. The latch members are releasable from engagement between the casing and the stopper upon displacement of the inertia body by a predetermined acceleration to enable release of the energy of the actuator spring and displacement of output member by the actuator spring.

1 Claim, 2 Drawing Sheets

MECHANICAL SENSOR FOR VEHICLE SEAT BELT SYSTEMS

BACKGROUND OF THE INVENTION

The present invention relates to a mechanical sensor for vehicle seat belt systems and, in particular, to a mechanical sensor for operating a spring-type seat belt pretensioner.

The seat belt systems with which some vehicles are equipped have belt pretensioners for applying a preload to the belt to pull it tightly against the occupant's body and more securely restrain the occupant in the seat in the event of a collision. Some belt pretensioners are associated with the belt retractor and operate by rotating the retractor reel in the belt-winding direction to tighten the belt. Other pretensioners pull down on the buckle to which the seat belt is fastened. Still other types of pretensioners form a loop in the belt or wind a segment of the belt onto a spool at a point between the buckle and the retractor. All types of pretensioners require a power source, and it is known to use either a piston/cylinder operated by detonation of gunpowder or a mechanical spring.

When the power source is of a type that uses gunpowder, an electrical trigger is usually used to ignite the gunpowder. Such systems are costly to make and install. There are advantages to pretensioners based entirely on mechanical components, i.e. springs as power sources and mechanical sensors to cause the release of the spring.

When a spring is used as a power source, it must produce a large force and operate through a relatively long stroke in order to pretension the belt extremely rapidly and tighten it enough to provide the desired pretension. A mechanical sensor for releasing the trigger mechanism must likewise provide a high releasing force and do so very rapidly.

Mechanical sensors of various designs have been proposed; examples are found in Japanese Utility Model Laid-open Publications No. 57-90159 and No. 58-33060 (Japanese Utility Model Publication No. 63-35017) and Japanese Patent Laid-open Publications No. 58-206765, No. 1-164650 and No. 1-164651. The sensors disclosed in the aforementioned publications comprise inertia bodies that directly engage a trigger that holds the spring in the set condition and upon movement by an inertial force operate the trigger to release the actuator spring of the pretensioner. In order to obtain a sufficiently high output force to operate the trigger, the inertia bodies in previously known sensors must have very large masses, which requires that they be of large size and high weight. Moreover, because the sensor is incorporated into the pretensioner in these known devices, it is subject to vibrations and other movements of the pretensioner, which must be taken into account in determining a suitable location for the use of such sensors. For example, it may not be suitable to use such sensors when the pretensioner is installed on a vehicle seat.

SUMMARY OF THE INVENTION

One object of the present invention is to provide a mechanical sensor for vehicle seat belt systems that provides a high output force but has a relatively small and lightweight inertia body. Another object is to provide a sensor that has a high response speed. Yet another object is to provide a mechanical sensor having excellent anti-vibration properties, thereby making it suitable for use in various locations in the vehicle. It is also desired to be able to install the sensor remote from the pretensioner.

The foregoing and other objects are attained, in accordance with the present invention, by a mechanical sensor that comprises a casing having an axis, an inertia body received in the casing for displacement axially thereof, and an output member received in the casing for displacement axially thereof and having a portion extending out of the casing so as to transmit displacement of the output member to the outside of the casing. A set spring biases the inertia body to a set position in the casing. A stopper is received for axial displacement within the casing, and an actuator spring is engaged between the inertia body and the stopper and is also engageable with the output member to cause it to displace upon displacement of the stopper. Latch members movably coupled to the inertia body are engaged between the stopper and the casing in the absence of displacement of the inertia body in response to a predetermined acceleration of the inertia body so that the stopper stores energy in the actuator spring. The latch members are releasable from engagement between the casing and the stopper upon displacement of the inertia body by a predetermined acceleration to enable release of the energy of the actuator spring and displacement of output member by the actuator spring.

In the present invention, the latch members are normally engaged between the stopper and the casing, and a preload force is stored in the actuator spring. Upon displacement of the inertia body in response to acceleration above a certain magnitude and duration, the inertia body moves and causes the latch members to be released from engagement between the casing and the stopper. Thereupon, the stored energy of the actuator spring is released, and the actuator spring displaces the output member, the output of which in the form of movement is transmitted to the outside of the casing.

For a better understanding of the invention, reference may be made to the following description of an exemplary embodiment, taken in conjunction with the accompanying drawings.

DESCRIPTION OF THE EMBODIMENT

Figure 1:
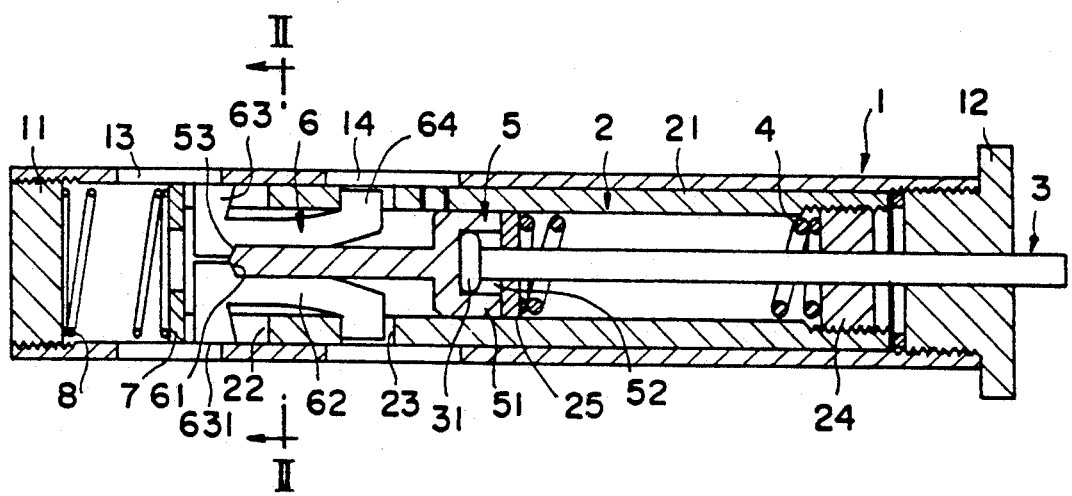
FIG. 1 is a side cross-sectional view of the embodiment taken along an axial plane.
Figure 2:
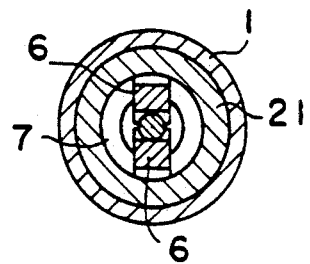
FIG. 2 is an end cross-sectional view of the embodiment taken along the line II—II of FIG. 1.

The mechanical sensor shown in the drawings comprises a casing 1 having an axis, an inertia body 2 received in the casing for displacement axially thereof, and an output member 3 received in the casing for displacement axially thereof and having a portion extending out of the casing so as to transmit displacement of the output member to the outside of the casing. A set spring 8 biases the inertia body to a set position in the casing. A stopper 5 is received for axial displacement within the casing, and an actuator spring 4 is engaged between the inertia body 2 and the stopper 5 and is also engageable with the output member 3 to cause it to displace upon displacement of the stopper 5. Latch members 6 movably coupled to the inertia body 2 are engaged between the stopper and the casing in the absence of displacement of the inertia body in response to a predetermined acceleration of the inertia body so that the stopper stores energy in the actuator spring. The latch members 6 are releasable from engagement between the casing and the stopper upon displacement of the inertia body by a predetermined acceleration to enable release of the energy of the actuator spring and displacement of output member by the actuator spring.

Figure 3:
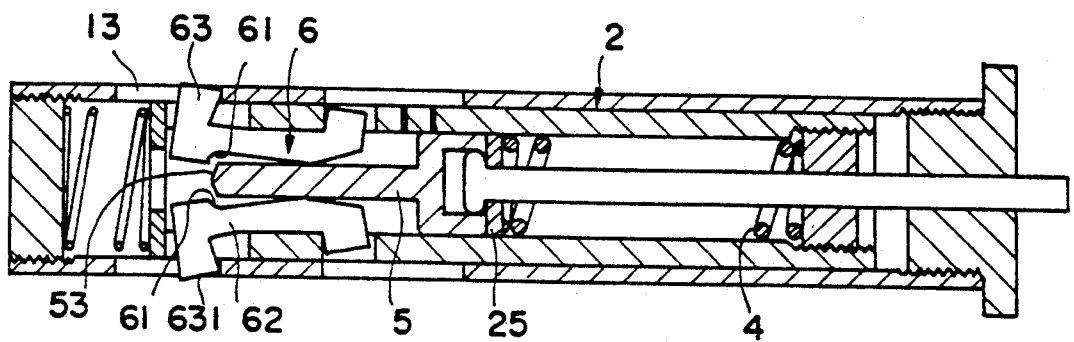
FIG. 3 is a side cross-sectional view showing the condition in which the mechanical sensor begins to operate.
Figure 4:
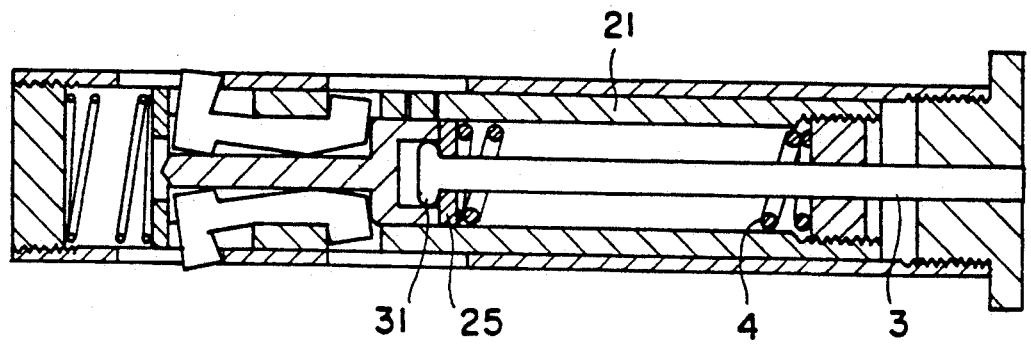
FIG. 4 is a side cross-sectional view showing the condition in which the operation of the mechanical sensor has been completed.

In describing the embodiment, the left sides of FIGS. 1, 3 and 4, i.e., the direction of movement the inertia body upon operation of the sensor, are referred as "front" for convenience. The casing 1 is tubular and is closed at its ends by caps 11 and 12 screwed into threaded portions inside the respective ends of the casing. The wall of the casing 1 has two pairs of elongated slots 13 and 14 located in the axial direction at front and rear positions, the slots of each pair being diametrically opposite each other.

The inertia body 2 includes a hollow cylindrical member 21 and has a pair of elongated slots located diametrically opposite each other at the front end of the member 21 and a pair of diametrically opposite slots 23 spaced-apart rearwardly of the slots 22. The front end of the member 21 is open, and a spring seat 24 is screwed into its rear end.

The stopper 5 is received inside the member 21. A cup-like portion 51 on the rear end of the stopper 5 is slidably supported on the inner wall surface of the member 21. A rear-facing recess 52 in the portion 51 receives a head portion 31 on the front end of the output member 3. The rear portion of the output member 3 passes through axial holes in the cap 12 and the spring seat 24 and is slidably supported relative to these components.

A spring retainer 25 abuts the rear edge of the stopper 5, and the actuator spring 4 is held compressed between the rear surface of the spring retainer 25 and the front surface of the spring seat 24 of the inertia body 2.

The front tip 53 of the stopper 5 is of conical shape and engages wedge surfaces 61 on the latches 6. Each latch 6 has radially outwardly extending arms 63 and 64, one at the front end and one at the rear end of an axial body portion 62. The corner formed at the junction of the axial body portion 62 and the arm 64 of each latch 6 engages a fulcrum, which is constituted by the front edge of the hole 23 in the member 21. The tip of the arm 63 of each latch 6 contacts the inner wall surface of the casing 1 and forms a friction support surface 631 to support the radial load component exerted by the stopper 5 on the casing 1 by virtue of the wedging action between the conical tip 53 of the stopper 5 and the wedge surfaces 61 of the latch.

An annular spring retainer 7 engages the front surface of the member 21, and a coil compression set spring 8 is held in compressed state between the spring retainer 7 and the cap 11. The set spring 8 is weaker than the actuator spring 4.

When the mechanical sensor is in set condition, as shown in FIG. 1, the front end of the member 21 is pushed by the set spring 8 acting through the spring retainer 7 and is displaced toward the rearmost position in the casing. Thus, the friction support surfaces 631 of the arms 63 of the latches 6 are supported on the inner peripheral surfaces of the casing 1, and the conical tip 53 of the stopper 5 engages the wedge surfaces 61 of the latches 6. Under this condition, the load of the actuator spring 4 is supported by the member 21 of the inertia body 2 through the spring seat 24 at its rear end and at the front by the member 21 at the fulcrums defined by the front edges of the holes 23 through the spring receptacle 25 and engagements between the stopper 5 and the latches 6; the axial force of the actuator spring forms a closed loop. As the result, the force on the member 21 exerted by the actuator spring 4 does no work, and only the force exerted by the set spring 8 acts on the inertia body 2.

When a high acceleration G occurs in a vehicle collision under this set condition and the product $(G \times m)$ of the acceleration G and the mass m of the movable components of the sensor (total mass m of member 21, actuator spring 4, stopper 5, latches 6, spring seat 24 and spring retainer 25) exceeds the sum $(f + \mu P)$ of the set load f of the set spring 8 and outward pressure p of the latches 6 times the coefficient of friction $\mu$ between the friction surfaces 631 and the casing 1, the inertia body 2 moves quickly forward, as shown in FIG. 3.

When the inertia body moves forward and the friction surfaces 631 of the arms 63 of the latches 6 reach the position of the slots 13 in the casing 1, the latches 6 lose the radial support that restrains their rotation about the fulcrums and are pivoted to the outward position shown in FIG. 3 by the radial components of the force from the tip of the stopper 5 acting on the wedge surfaces 61 of the latches 6. Thus, the support of the conical tip 5 against forward displacement by the latches 6 is lost, and the stopper is moved rapidly forward, as shown in FIG. 4, by the biasing force of the actuator spring 4 acting through the spring retainer 25 on the rear end surface of the stopper.

When the stopper 5 moves forward, there is nothing to restrain the forward movement of the spring retainer 25, and the biasing force of the actuator spring 4 is quickly released. The head 31 of the output member 3 is pushed by the spring retainer 25 and moves quickly forward in the member 21. As the result, the displacement of the output member 3 is delivered as sensor output in the form of displacement of the output member. The output member 3 may be connected directly to the trigger mechanism of the pretensioner, or it may be connected to the trigger mechanism through a wire cable.

It is possible, according to the arrangement of this embodiment, to operate the latches 6 by a slight moving stroke of the mass body 2 and to displace the output member 3 by the operation of the actuator spring 4. This makes it possible to increase the response speed of the sensor. Because the set spring 8 acts in a direction to hinder the operation of the mass body 2 in the set condition, the possibility to induce erroneous operation due to vibration is eliminated, and the sensor has enhanced anti-vibration properties.

The embodiment described above and shown in the drawings is exemplary of the features of the invention, and the invention is not limited to the above embodiment. Various changes and modifications can be made depending upon actual conditions and the selection of component materials without departing from the scope of the invention as set forth in the claims.

As described above, it is possible with the use of a mechanical sensor according to the present invention to obtain a large sensor output without delay in operation despite the light weight of the inertia body because the output member is operated by the energy accumulated in the actuating spring through triggering by slight movement of the inertia body. Because the actuating spring and its operating mechanism are also utilized as a mass subject to inertia forces, the entire unit can be designed in very compact form. Therefore, it is possible to reliably operate the trigger mechanism of a spring type pretensioner under strong spring load and, as the result, to quickly eliminate a large amount of slack in the seat belt within a short time.

Because the mechanical sensor of the present invention has an arrangement in which the latches of the release mechanism are rotated around a fulcrum, there is no component part that is either deformed or dislodges during operation, and the sensor can be easily reset.

I claim:

1. A mechanical sensor for vehicle seat belt systems comprising a casing having an axis, an inertia body received in the casing for displacement along the axis of the casing, and output member received in the casing for displacement axially thereof and having a portion extending out of the casing so that displacement of the output member is transmitted to the outside of the casing, a set spring biasing the inertia body to a set position in the casing, a stopper received for axial displacement within the casing, an actuator spring engaged between the inertia body and the stopper and exerting a force on the stopper relative to the inertia body and engageable with the output member to cause the output member to displace upon displacement of the stopper, and latch means including latch members movably coupled to the inertia body and engaged between the stopper and the casing in the absence of displacement of the inertia body in response to a predetermined acceleration of the inertia body for storing energy in the actuator spring and releasable from engagement with the stopper upon displacement of the inertia body to enable release of the energy of the actuator spring to displace the output member.

* * * * *